United States Patent [19]
Fukuda et al.

[11] Patent Number: 5,827,043
[45] Date of Patent: Oct. 27, 1998

[54] COOLABLE AIRFOIL

[75] Inventors: Takao Fukuda, East Hartford; Francis R. Price, Glastonbury; Conan P. Cook, Tolland; Richard W. Hoff, Glastonbury; Irwin D. Singer, West Hartford, all of Conn.

[73] Assignee: United Technologies Corporation, Hartford, Conn.

[21] Appl. No.: 883,925

[22] Filed: Jun. 27, 1997

[51] Int. Cl.⁶ ...................................................... F01D 9/06
[52] U.S. Cl. ...................... 415/115; 415/121.2; 416/97 R
[58] Field of Search ................... 415/115, 116, 415/121.2, 169.1; 416/95, 96 R, 97 R, 97 A, 96 A

[56] References Cited

U.S. PATENT DOCUMENTS

| | | | |
|---|---|---|---|
| 2,746,671 | 5/1956 | Newcomb | 230/120 |
| 3,356,340 | 12/1967 | Bobo | 253/39.15 |
| 3,362,155 | 1/1968 | Driscoll | 415/121.2 |
| 3,673,771 | 7/1972 | Dickey | 55/306 |
| 3,766,719 | 10/1973 | McAnally, III | 415/121.2 |
| 4,309,147 | 1/1982 | Koster et al. | 416/95 |
| 4,527,387 | 7/1985 | Lastrina et al. | 60/39.092 |
| 4,775,296 | 10/1988 | Schwarzmann et al. | 416/97 R |
| 5,207,556 | 5/1993 | Frederick et al. | 415/115 |
| 5,337,805 | 8/1994 | Green et al. | 164/369 |
| 5,462,405 | 10/1995 | Hoff et al. | 416/97 R |
| 5,498,126 | 3/1996 | Pighetti et al. | 415/115 |
| 5,645,397 | 7/1997 | Soechting et al. | 415/115 |

*Primary Examiner*—Edward K. Look
*Assistant Examiner*—Richard Woo
*Attorney, Agent, or Firm*—Monica G. Krasinski

[57] ABSTRACT

A coolable airfoil having a passage for discharging particulates entrained in cooling air is disclosed. Various construction details are developed to provide clean cooling air to the leading edge of the airfoil. In one embodiment, a chordwise duct extends past a spanwisely extending supply passage to the inlet of a spanwisely extending rear passage such that momentum effects direct the flow of a portion of cooling air and particulates from the duct, past the entrance of the supply passage and into the rear passage and a larger portion of the flow of cooling air into the supply passage for cooling the leading edge of the airfoil.

12 Claims, 3 Drawing Sheets

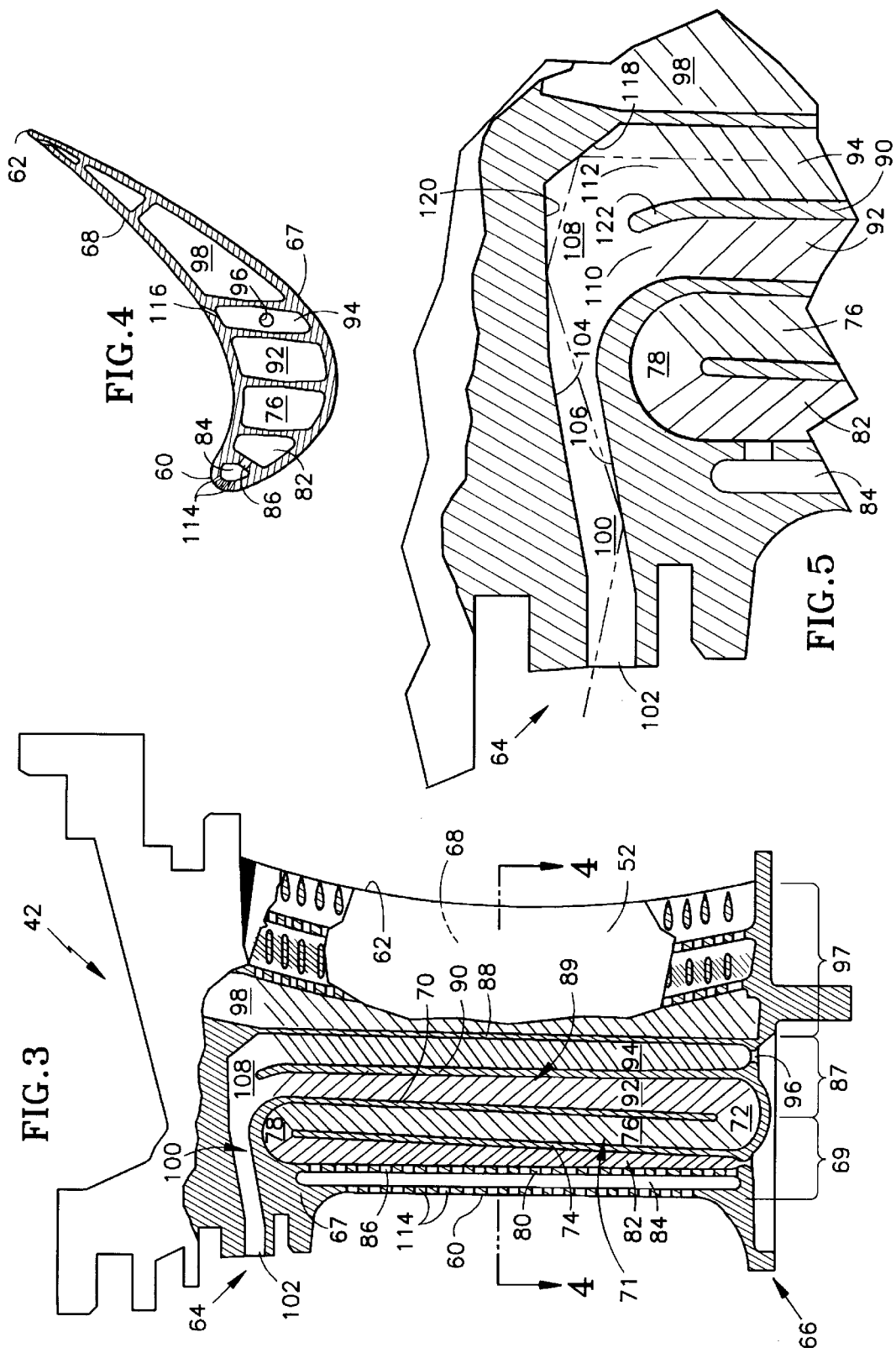

COOLABLE AIRFOIL

TECHNICAL FIELD

The present invention relates generally to gas turbine engines and more particularly to a coolable airfoil for the turbine section of such an engine utilizing cooling fluid having particulates and provides for the separation of particulates from the cooling fluid.

DESCRIPTION OF THE PRIOR ART

An axial flow rotary machine, such as a gas turbine engine for an aircraft, includes a compression section, a combustion section and a turbine section. A flow path for hot working medium gases extends axially through the engine. The flow path for hot gases is is generally annular in shape.

As working medium gases are flowed along the flow path, the gases are compressed in the compression section causing the temperature and pressure of the gases to rise. The hot, pressurized gases are burned with fuel in the combustion section to add energy to the gases. These gases are expanded through the turbine section to produce useful work and thrust.

Both the compression section and turbine sections include alternating rows or stages or rotating and stationary airfoils. Each airfoil comprises an airfoil portion having a leading edge and a trailing edge. The rotating and stationary airfoils, also known as blades and vanes respectively, extend radially outwardly to receive energy from the hot working medium gases. Thus, the components of the turbine operate in an especially hostile environment that is characterized by extremely high temperatures.

The temperature of hot combustion gases entering the turbine generally exceeds the melting point temperatures of the alloys from which the turbine airfoils are fabricated. As the airfoils are bathed in hot working medium gases during operation, thermal stresses result in the airfoils. These thermal stresses affect the structural integrity and service life of the airfoils.

Thus, to properly perform in the harsh environments in the turbine section, the turbine airfoils must be cooled. The initial stages of turbine airfoils need substantially more cooling than subsequent stages because the temperature and pressure of gaseous products of combustion are highest at the turbine entrance, and decrease progressively therefrom. Moreover, each airfoil requires more cooling at the leading edge than at the trailing edge because the temperature and pressure of the products of combustion are higher at the leading edge of the airfoil than at the trailing edge.

Thus, airfoils are typically cooled to reduce thermal stresses and thereby provide the airfoils with satisfactory structural integrity and service life. An example of such an airfoil is shown in U.S. Pat. No. 5,498,126 entitled "Airfoil With Dual Source Cooling", issued to Pighetti et al. and assigned to the assignee of this application. In Pighetti et al., the airfoils are cooled by channeling compressor bleed air at a higher pressure through the leading edge passage of the airfoil and channeling compressor bleed air at a lower pressure through the trailing edge passage of the airfoil. The higher pressure in the leading edge passage of each airfoil blocks the flow of products of combustion from the working medium flow path into the internal passage of the airfoil. The leading edge is cooled by impingement cooling by bleeding the compressor air from the high pressure stages of the compressor. Use of high pressure compressor air rather than a mixture of high pressure and low pressure air would be undesirable because it directly diverts air from the combustion process, thereby reducing the overall performance of the engine. Thus, high pressure compressor air is used only to cool the leading edge portion of the airfoil while the trailing edge portion is cooled by air supplied from the low pressure stages of the compressor.

However, high pressure compressor air has more particulates entrapped in it compared to the low pressure compressor air used to cool the trailing edge portion of the airfoil. The high pressure compressor air may have particulates such as dirt particulates, silica particulates and ceramic coating particulates entrapped in this source of cooling air. These particulates originate primarily from the compressor outer seal and wear of the combustor. In contrast, the low pressure compressor air is routed to the trailing edge portion of the turbine airfoils prior to the burner. As a result, the low pressure compressor air is relatively clean and thus relatively free of particulates.

Presence of dirt or other particulates in cooling air may prevent proper cooling and eventually cause premature destruction of turbine airfoils. Cooling passages and cooling holes in the turbine airfoils are of extremely small diameters. Particulates tend to deposit within the passages or cooling holes in the airfoils and block them. Even particulates of micron size can rather quickly reduce the air flow and impede the transfer of heat necessary for cooling. As a result, the amount of cooling air flowing through the passages is reduced and, in some instances, cooling flow is completely restrained if the passages are totally obstructed. Reduced or nonexistent cooling has a detrimental effect upon the life of the turbine airfoils during engine operation and hence, is a direct cause of high maintenance and replacement costs.

While means are usually employed for removing larger particles of dirt before the air enters the compressor, nonetheless smaller particles remain in the cooling air even after it has traveled a considerable distance from the compressor to the turbine. Also there is the possibility of particulates originating from the engine itself becoming entrained in the cooling air.

One early approach to removal of particulates from a cooling air stream associated with the cooling system for the turbine blades of a gas turbine engine is shown in U.S. Pat. No. 4,309,147 issued to Koster et al. entitled "Foreign Particle Separator". In Koster et al., a rotating chamber is disposed in the flow path and is adapted to rotate about the engine centerline. Cooling air, contaminated with foreign particulate matter such as sand, is delivered to the rotating chamber where the sand entrained in the cooling air is centrifuged radially outward. Clean cooling air exits the chamber at a radial distance which is less than the radial distance of the inlets into the chamber from the engine centerline. This clean cooling air then flows to cool the turbine blades.

Another approach to removing particulates in a coolable airfoil is shown in U.S. Pat. No. 4,775,296 issued to Schwarzmann et al. and assigned to the assignee of this application. In Schwarzmann et al., the cooling passage in the leading edge region is in flow communication with the trailing edge region through a turning passage and a hole connecting the turning passage with the trailing edge region for discharging particulate matter from the cooling passage. Thus, the service life of the airfoil is enhanced by removing particulate matter from the tip region of the airfoil through a conduit which ducts cooling air through low flow regions of the airfoil.

Modern higher thrust engines require cooling schemes using cleaner uncontaminated cooling air than used before for turbine airfoils, in particular for second stage turbine vanes. Modern compressors include additional stages of airfoils resulting in higher temperatures and pressures of the products of combustion entering the turbine. The turbine airfoils need more cooling than prior art airfoils to avoid destructive burning of the airfoil walls. In particular, the leading edge of the airfoils need more cooling than the trailing edge because the external pressures and temperatures are higher at the leading edge. As a result, modern higher thrust engines use higher pressure compressor cooling air to cool the leading edge, have intricate passages with small openings and require cleaner air than in the past.

Although cooling by higher pressure compressor air is necessary for the airfoil to avoid burning the leading edge, the major drawback to the use of higher pressure air remains the entrained particulates in cooling air which block the cooling passages and holes in the airfoils as set forth hereinabove. Thus, there is a need to provide for the removal of particulates in coolable airfoils.

Accordingly, scientists and engineers working under the direction of applicant's assignee are seeking to develop coolable airfoils for modern higher thrust engines which have means for removing particulates from the cooling air supplied to such airfoils.

SUMMARY OF THE INVENTION

According to the present invention, a coolable airfoil having a spanwisely extending forward passage and a spanwisely extending rear passage for discharging particulates entrained in cooling air, includes a chordwisely extending duct which extends past the forward passage to the rear passage such that momentum effects direct the flow of a portion of cooling air to the entrance of the forward passage for cooling the leading edge of the airfoil and the remainder of the cooling air and particulates into the rear passage.

In accordance with one particular embodiment of the invention, the duct includes a chordwisely extending inlet passage and a chordwisely extending expansion chamber which is axially rearwardly of the inlet passage, wherein cooling air containing particulates flows into the expansion chamber and then either into the forward or rear spanwisely extending passages which are in flow communication with the expansion chamber.

In accordance with one particular embodiment of the invention, the chordwisely extending inlet passage is angled spanwisely away from the spanwisely extending forward and rear passages.

In accordance with one particular embodiment of the invention, the expansion chamber adjacent the midchord region of the airfoil is bounded adjacent the trailing edge region by a wall angled with respect to incoming cooling air flow and toward the entrance of the rear passage so that a portion of the cooling air flow and particulates are urged by the angled wall toward the entrance of the rear passage.

A primary feature of the present invention is a coolable airfoil having a chordwisely extending duct. Another feature is a spanwisely extending forward supply passage.

Another feature is a spanwisely extending rear passage. The forward supply passage is in flow communication with a serpentine passageway in the leading edge region. The serpentine passageway has cooling air holes. Another feature is that the rear passage is in flow communication with the exterior of the airfoil via a purge hole and cooling air holes. The purge hole has a larger cross sectional flow area than the cooling air holes in the purge passage and in the serpentine passageway. In one detailed embodiment, the duct has a chordwisely extending inlet passage and a chordwisely extending expansion chamber axially rearwardly of the inlet passage. The expansion chamber is adjacent the midchord region of the airfoil. The expansion chamber has two outlets. In one detailed embodiment, the chordwisely extending inlet passage is angled spanwisely away from the spanwisely extending forward and rear passages. In one detailed embodiment, the expansion chamber is bounded adjacent the trailing edge region by a wall angled toward the entrance of the rear passage.

A primary advantage of the present invention is the level of durability and service life which results from cooling the airfoil with clean cooling air as the particulates are diverted away from the entrance into the leading edge region. These particulates could block internal cooling passages and cooling holes. Another advantage is the ease of maintenance and repairability of the airfoils which results from having a passage with a relatively large purge hole to purge cleaning fluids during maintenance activity.

The foregoing and other objects, features and advantages of the present invention will become more apparent in the light of the following detailed description of the best mode for carrying out the invention and from the accompanying drawings which illustrate an embodiment of the invention.

BRIEF DESCRIPTION OF THE DRAWINGS

FIG. 3 is an enlarged, side elevation view partially broken away for clarity of the airfoil shown in FIG. 2;

FIG. 4 is a cross sectional view taken along the lines 4—4 of the airfoil shown in FIG. 3; and FIG. 5 is an enlarged view of a portion of the airfoil shown in FIG. 3.

BEST MODE FOR CARRYING OUT THE INVENTION

Figure 1:
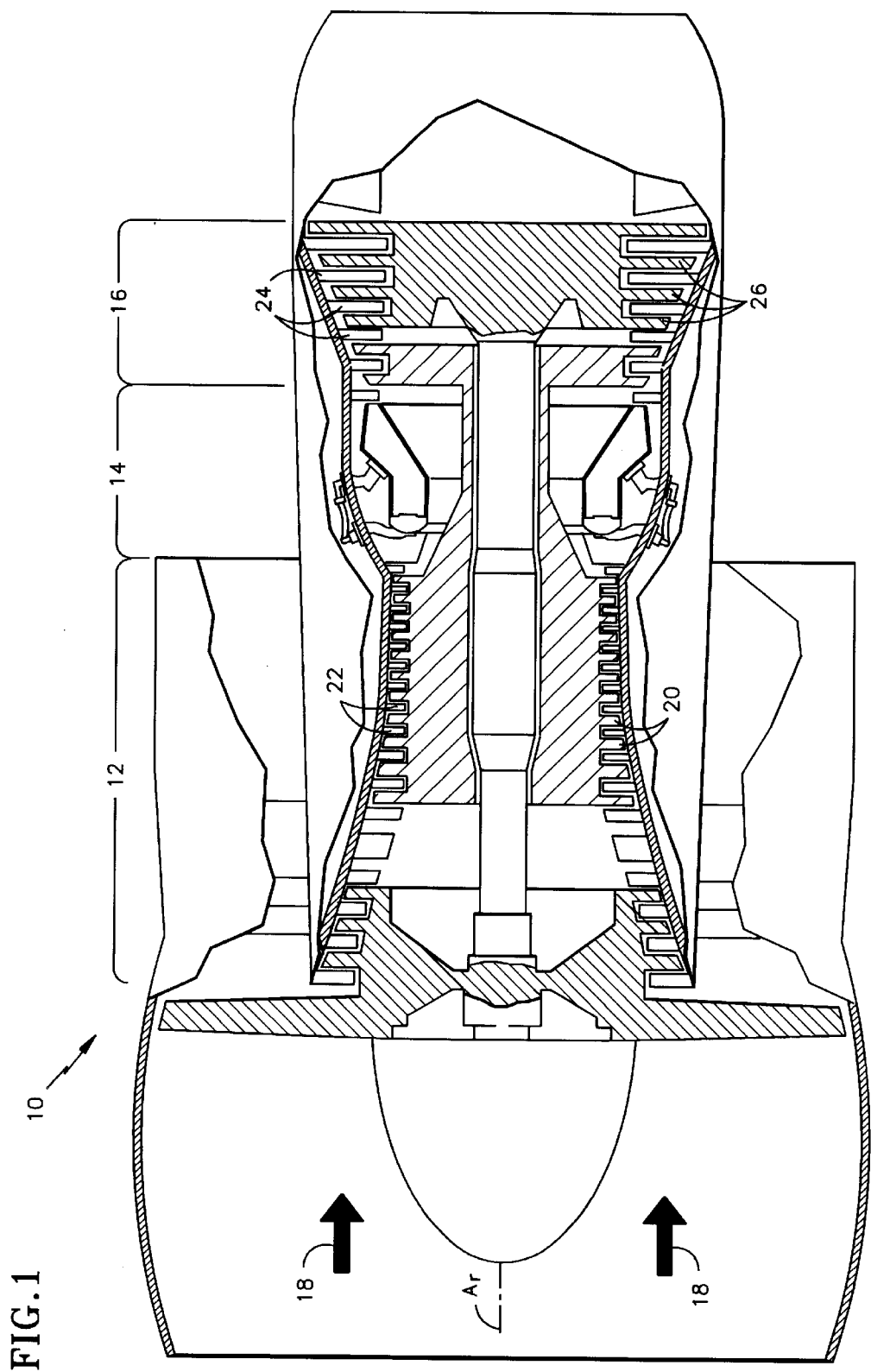
FIG. 1 is a schematic, side elevation view of a gas turbine engine with portions broken away for clarity.

Referring to FIG. 1, a gas turbine engine 10 includes a compressor section 12, a combustor section 14 and a turbine section 16. Working medium gases 18 flow axially through the sections 12, 14 and 16 of the engine 10. The compressor 12 includes a plurality of alternating rows or stages of rotating and stationary airfoils 20, 22 respectively. The turbine 16 also comprises alternating stages of stationary and rotating airfoils 24, 26, respectively.

Figure 2:
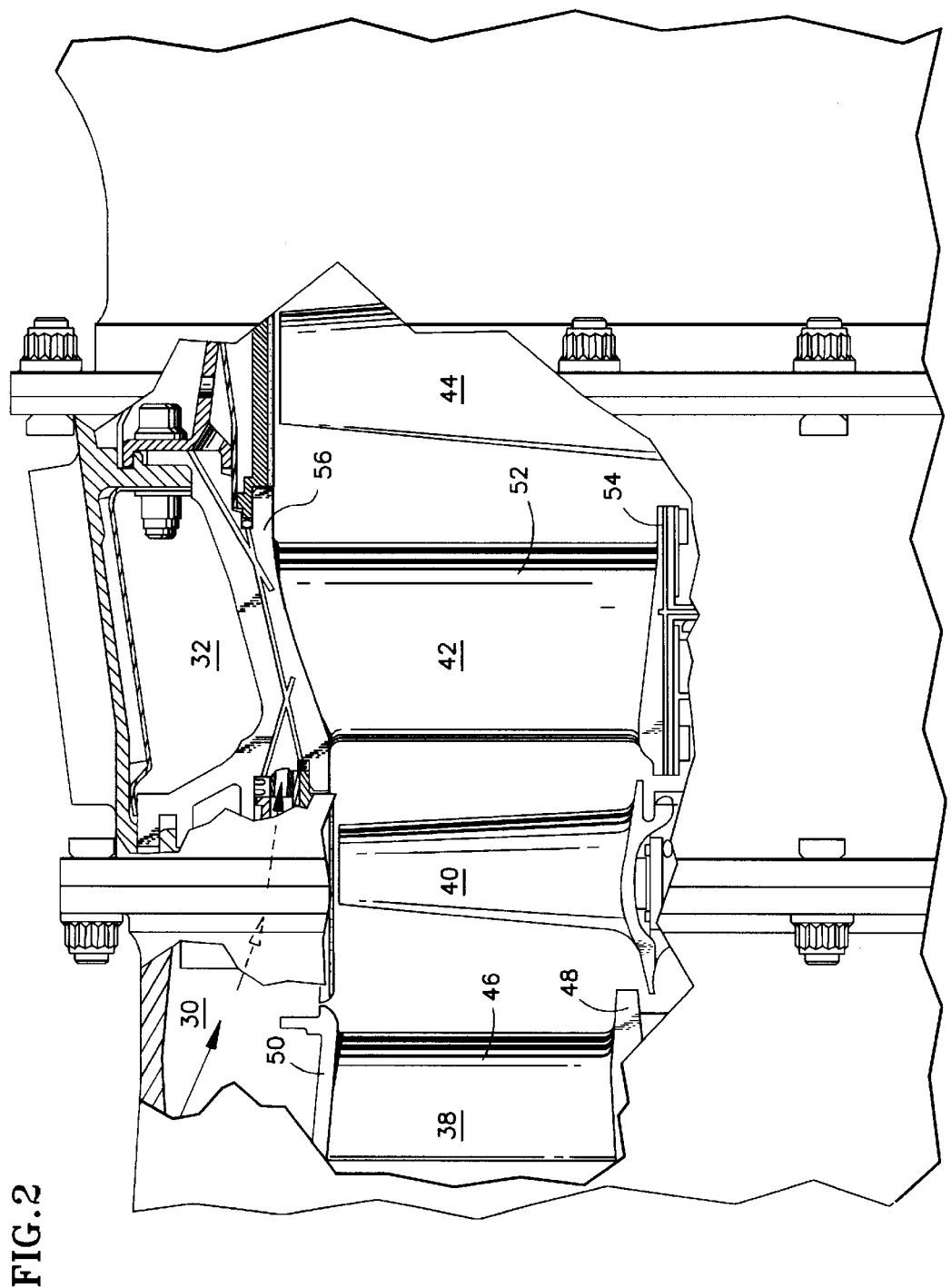
FIG. 2 is an enlarged sectional elevation of a portion of a turbine of the gas turbine engine of FIG. 1 showing an airfoil according to the present invention.

Referring to FIG. 2, a first plenum 30, is pressurized with a source of relatively constant, high pressure air bled from a high pressure stage of the compression section 12, bypassing combustor 14. A second plenum 32 receives a source of relatively constant lower pressure air pressure bled from a low pressure stage of compression section 12, upstream the higher stage of compressor air bled to the first plenum 30.

The first stage of airfoils at the turbine entrance comprises a plurality of first stage vanes 38 followed by first stage rotable blades 40 succeeded by second stage vanes 42 and second stage blades 44. The first stage vane 38 includes an airfoil portion 46. The first stage vane has an inner platform 48 and an outer platform 50. The outer platform 50 is spaced radially inward from the case to leave the first plenum 30 therebetween. The second stage vane 42 includes an airfoil portion 52. The second stage vane has an inner platform 54 and an outer platform 56. The outer platform 56 is spaced radially inward from the case to leave the second plenum 32 therebetween.

Referring to FIG. 3, the airfoil portion 52 of the second stage vane 42 includes a leading edge 60 and a trailing edge 62. The airfoil also includes a first end 64 and a second end 66. A suction side wall 67 and a pressure side wall 68 are joined at the leading edge and the trailing edge. The pressure side wall is spaced from the suction side wall to form a cavity therebetween. A leading edge region 69 extends chordwisely rearwardly from the leading edge. The leading edge region has a first rib 70 which extends in the spanwise direction and is spaced rearwardly from the leading edge to form a first chamber 71 therebetween. The first rib 70 is spaced spanwisely from the second end 66 to leave an inlet 72 into the leading edge region. A second rib 74 extends in the spanwise direction in the leading edge region. The second rib 74 is spaced chordwisely forward from the first rib 70 leaving a first passage 76 therebetween. The second rib 74 is spaced spanwisely from the first end 64 to leave a turning passage 78 therebetween. This turning passage 78 is in flow communication with the first passage 76. The leading edge region further has a third rib 80 which extends in the spanwise direction and is spaced chordwisely forward from the second rib 74 leaving a second passage 82 therebetween. The third rib 80 is spaced chordwisely rearwardly from the leading edge 60 and defines a third passage 84 therebetween. The third rib has a plurality of impingement holes 86.

The airfoil has a midchord region 87 adjacent to the leading edge region 69. A fourth rib 88 extends spanwisely in the midchord region. The fourth rib 88 is spaced rearwardly from the first rib 70 and forms a second chamber 89 therebetween. A fifth rib 90 is disposed in the second chamber and extends spanwisely to divide the second chamber into two passages. The first supply passage 92 is in flow communication with the inlet 72 into the leading edge region. A second purge passage 94 has a purge hole 96 on the second end 66 which allows the airfoil 52 to be in flow communication with the exterior of the airfoil.

The airfoil has a trailing edge region 97 which is rearwardly adjacent to the midchord region. This region has an inlet passage 98 for providing cooling air to the trailing edge region. The inlet passage 98 into the trailing edge region is in flow communication with internal cooling chambers in the trailing edge region.

The airfoil 52 also has a duct 100 which extends in the chordwise direction in the first end 64. The duct 100 has an inlet passage 102 which extends chordwisely in the leading edge region 69. This inlet passage 102 adapts the airfoil 42 to receive cooling air from a source of cooling air. The duct also has an expansion chamber 108 which extends in the chordwise direction and is adjacent the midchord region 87.

FIG. 4 is a cross sectional view taken along the lines 4—4 of the airfoil shown in FIG. 2. The view shows the first passage 76, the second passage 82 and the third passage 84 in the leading edge region 69. The third passage 84 is in flow communication with the exterior of the airfoil through cooling film holes 114.

In addition, the view shows the first supply passage 92 and the second purge passage 94 in the midchord region 87 of the airfoil 52. The second purge passage is in flow communication with the exterior of the airfoil via the purge hole 96. The second purge passage also has a plurality of cooling film holes 116 along the pressure side wall 68. The cross sectional flow area of the purge hole is larger than the cross sectional flow area of a cooling air hole 116.

FIG. 5 is an enlarged view of a portion of the airfoil, in particular the duct 100, shown in FIG. 3. The inlet passage 102 in the duct 100 is bounded by a first wall 104 in the first end 64 and a second wall 106 spaced spanwisely away from the first wall. The first and second walls are angled spanwisely away from the spanwisely extending first supply passage 92, and second purge passage 94. The expansion chamber 108 is bounded adjacent the trailing edge region 97 by a wall 118 angled toward the entrance of the second purge passage 94. The expansion chamber is also bounded adjacent the first end 64 by a chordwisely extending wall 120. Further, the expansion chamber 108 has two outlets. The first outlet 110 is in flow communication with the first supply passage 92 and a second outlet 112 is in flow communication with the second purge passage 94. In addition, the upper portion 122 of the fifth rib 90 is angled away from the entrance of the second purge passage 94.

During operation of the gas turbine engine, working medium gases 18 are compressed in the compressor 12 with their temperature and pressure rising as the gases flow through a plurality of alternating rows or stages of rotating and stationary airfoils 20, 22 respectively. The compressed gases are mixed with fuel and burned in the combustor 14. The products of combustion exiting the combustor are at their highest temperature and pressure as they enter the turbine 16 which comprises alternating stages of stationary and rotating airfoils 24, 26, respectively. As the working medium gases are expanded in the turbine 16, the temperature and pressure of the products of combustion gradually decrease. The hot gases produce thrust for propulsion and drive the turbine 16 about its axis of rotation $A_r$ which in turn drives the compressor 12.

Cooling air is flowed from plenum 30 to the duct 100 in the first end 64 of the airfoil 52. Cooling air enters the airfoil via the inlet passage 102 in the first end. This cooling air has particulates of various sizes entrained therein. The flow of cooling air and duct wall geometry defined by angled walls 104, and 106, urges these particulates towards the second wall 106 in the inlet passage. The particulates impact the second wall 106 in this inlet passage 102 and are directed away from the entrance 110 into the first supply passage 92 and toward the expansion chamber 108 rearwardly of the inlet passage. In the expansion chamber the particulates entrained in cooling air ricochet off the walls bounding the expansion chamber 118, 120. In addition, particulates also ricochet off the upper portion 122 of the fifth rib 90 shown in FIG. 5 in the midchord region 87. As such, the particulates entrained in cooling air are directed to flow into the rear purge passage 94. Momentum effects and the effects of impacting the expansion chamber walls 118, 120 and the upper portion 122 of the fifth rib 90 urge the movement of a majority of particulates into the rear passage 94. Thus, a portion of cooling air with particulates entrained therein are discharged from the airfoil 52 through the purge hole 96 in the purge passage 94.

A larger portion of cooling air is flowed into the forward supply passage 92 and provides cooling air into the leading edge region 69 of the airfoil 52. As a result the air in the forward supply passage 92 is relatively free of particulates and is thus clean.

In a particular embodiment of the invention about sixty percent (60%), that is a range of fifty eight to sixty two percent (58 to 62%), of cooling air is directed into the first supply passage 92. While forty percent (40%), that is a range of thirty eight to forty two percent (38 to 42%), of cooling air with particulates is directed into the second purge passage 94 as purge cooling air flow.

In addition, in a particular embodiment of the invention the purge hole 96 in the purge passage 94 is sized such that about sixty percent (60%) of the purge cooling air flow exits the airfoil through the purge hole. The remaining purge cooling air flow, about forty percent (40%), exits the airfoil 52 through the cooling film holes 116 present along the pressure side wall 68 thereby providing further cooling to a larger surface area of the exterior of the airfoil.

Further, in a particular embodiment of the invention, the duct wall geometry and purge hole is sized to achieve maximum particulate separation. A particulate separation efficiency characteristic is defined as:

$$\eta_{sep} = \frac{\text{Weight of separated particulates}}{\text{Total weight of particulates}}$$

About ninety five percent (95%) of particulates, defined as a range between ninety three percent (93%) and ninety seven percent (97%), of particulates entrained in cooling air are discharged from the airfoil through the purge passage. The remaining approximately five percent (5%) of particulates enter the first supply passage along with cooling air.

A particular advantage of this construction is that the majority of particulates entrained in cooling air exit the airfoil via the second purge passage. These particles could block internal cooling passages and cooling holes. Relatively clean cooling air is supplied to the leading edge region providing for cooling to the leading edge. Thus, the level of durability and life that results from cooling the airfoil with clean cooling air is improved. Another advantage is the ease of maintenance and repairability of airfoils which results from having a passage with a relatively large purge hole to purge cleaning fluids during maintenance activity.

Although the invention has been shown and described with respect to detailed embodiments thereof, it should be understood by those skilled in the art that various changes in form and detail thereof may be made without departing from the spirit and the scope of the claimed invention.

What is claimed is:

1. A coolable airfoil for gas turbine engines having a first end, a second end, a leading edge disposed between the first end and the second end, a trailing edge disposed between the first end and the second end, a suction side wall extending from the leading edge to the trailing edge, a pressure side wall joined to the suction side wall at the leading edge and the trailing edge and spaced from the suction side wall to form a cavity therebetween, a leading edge region which extends chordwisely rearwardly from the leading edge, a midchord region rearwardly adjacent the leading edge region, a trailing edge region rearwardly adjacent the midchord region, said coolable airfoil characterized by:

a first supply passage extending spanwisely in the midchord region, the passage being in flow communication with one of said edge regions, a second purge passage rearwardly of the first passage and extending spanwisely in the midchord region, the second passage having a purge hole in the second end in flow communication with the exterior of the airfoil, a duct which extends in the chordwise direction in the first end and adapts the airfoil to receive cooling air flow from a source of cooling air, the duct being in flow communication with said first supply passage and said second purge passage, wherein under operative conditions the duct adapts the airfoil to receive cooling air having particulates of various sizes and directs the flow chordwisely such that momentum effects direct the flow of a first portion of cooling air and particulates past the first supply passage, into the rear purge passage and out through the purge hole and a larger flow of cooling air into the first supply passage to provide cooling air into said edge regions of the airfoil.

2. The coolable airfoil of claim 1 characterized by said duct having an inlet passage which extends chordwisely in the leading edge region and an expansion chamber which extends in the chordwise direction adjacent the midchord region, the expansion chamber having a first outlet in flow communication with said first supply passage and a second outlet in flow communication with said second purge passage.

3. The coolable airfoil of claim 2 characterized by said edge region being the leading edge region.

4. The coolable airfoil of claim 2 characterized by said inlet passage having walls that are angled spanwisely away from the spanwisely extending first supply and second purge passages.

5. The coolable airfoil of claim 2 characterized by said expansion chamber being bounded adjacent the first end by a chordwisely extending wall, and adjacent the trailing edge region by a wall angled toward the entrance of the second purge passage such that the particulates ricochet off the expansion chamber walls and are directed into the purge passage.

6. The coolable airfoil of claim 2 characterized by said first supply and second purge passages having a rib therebetween separating the first and second passages, the rib having an upper portion angled away from the entrance of the second purge passage such that particulates ricocheting off the expansion chamber walls impact the angled upper portion of the rib and are directed into the second purge passage.

7. The coolable airfoil of claim 2 characterized by said inlet passage extending about sixty five percent (65%) of the axial length of the airfoil.

8. The coolable airfoil of claim 2 characterized by about sixty percent (60%) of the cooling air being directed into the first supply passage and about forty percent (40%) of the cooling air with particulates being directed into the second purge passage.

9. The coolable airfoil of claim 2 characterized by said second purge passage having a plurality of cooling air holes along said pressure side wall and a purge hole in said second end, each cooling air hole having a first cross sectional flow area and the purge hole having a second cross sectional flow area wherein the second cross sectional flow area is greater than the first cross sectional flow area such that momentum effects direct the flow of particulates entrained in cooling air to the purge hole while cooling air exits through the cooling air holes in the second purge passage.

10. The coolable airfoil of claim 9 characterized by about sixty percent of the cooling air flow with particulates in the purge passage exiting the airfoil through the purge hole.

11. The coolable airfoil of claim 2 having a particulate separation efficiency characteristic characterized by a particulate separation efficiency characteristic wherein about ninety five percent (95%) of particulates in the cooling air flow are discharged through said purge hole while only about five percent (5%) of particulates in cooling air enter the first supply passage.

12. A coolable airfoil for gas turbine engines which comprises:

a first end, a second end, a leading edge disposed between the first end and the second end, a trailing edge disposed between the first end and the second end, a suction side wall extending from the leading edge to the trailing edge, a pressure side wall joined to the suction side wall at the leading edge and the trailing edge and spaced from the suction side wall to form a cavity therebetween, a leading edge region which extends chordwisely rearwardly from the leading edge and having
- a first rib which extends in the spanwise direction and is spaced rearwardly from the leading edge to form a first chamber, the first rib being spaced spanwisely from the second end to leave an inlet into the leading edge region,
- a second rib which extends in the spanwise direction and is spaced chordwisely forward from the first rib leaving a first passage therebetween, the second rib being spaced spanwisely from the first end to leave a turning passage therebetween which is in flow communication with the first passage,
- a third rib which extends in the spanwise direction and is spaced chordwisely forward from the second rib leaving a second passage therebetween, the third rib being spaced chordwisely rearwardly from the leading edge and defining a third passage therebetween, the third rib having a plurality of impingement holes therethrough for flow communication between the second and third passage, a midchord region rearwardly adjacent the leading edge region having
- a fourth rib which extends in the spanwise direction and is spaced rearwardly from the first rib to form a second chamber therebetween,
- a fifth rib disposed in the second chamber and extending spanwisely to divide the second chamber into a first supply passage in flow communication with the inlet into leading edge region and a second purge passage having a purge hole in the second end in flow communication with the exterior of the airfoil, the second purge passage having a plurality of cooling air holes along said pressure side wall, each cooling air hole having a first cross sectional flow area and the purge hole having a second cross sectional flow area wherein the second cross sectional flow area is greater than the first cross sectional flow area, a trailing edge region rearwardly adjacent the midchord region of the airfoil having an inlet passage for providing cooling air into the trailing edge region, said inlet passage in flow communication with a plurality of internal cooling chambers, a duct which extends in the chordwise direction in the first end for supplying cooling air to the leading edge and midchord region of the airfoil having
- an inlet passage which extends chordwisely in the leading edge region and adapts the airfoil to receive cooling air flow from a source of cooling air, the inlet passage being bound by a first wall in the first end and a second wall spaced spanwisely away from the first end,
- an expansion chamber which extends in the chordwise direction adjacent the midchord region having a first outlet in flow communication with said first supply passage which extends spanwisely in the midchord region, and a second outlet in flow communication with said second purge passage which extends spanwisely in the midchord region, wherein the first and second walls of the inlet passage to the expansion chamber are angled spanwisely away from the spanwisely extending first supply and second purge passages and are adapted to receive cooling air from a source of cooling air at a first pressure, wherein the inlet passage to the trailing edge is adapted to receive cooling air from a source of cooling air at a second pressure, wherein the expansion chamber is bounded adjacent the first end by a chordwisely extending wall, and adjacent the trailing edge region by a wall angled toward the entrance of the second purge passage, wherein the fifth rib has an upper portion angled away from the entrance of the second purge passage, wherein under operative conditions the duct adapts the airfoil to receive cooling air having particulates of various sizes and directs the flow chordwisely wherein the flow of cooling air urges the particulates toward the second wall in the inlet passage wherein the particulates impact the second wall and are then directed toward the expansion chamber wherein the particulates ricochet off the walls bounding the expansion chamber and the upper portion of the fifth rib such that momentum effects direct the flow of a first portion of cooling air and particulates past the forward supply passage, into the rear purge passage and out through the purge hole and a larger flow of cooling air into the forward supply passage to provide cooling air into the leading edge region of the airfoil.

* * * * *